US 9,483,330 B2

(12) United States Patent
Whetsel (10) Patent No.: US 9,483,330 B2
(45) Date of Patent: *Nov. 1, 2016

(54) TRUSTED CLIENT-CENTRIC APPLICATION ARCHITECTURE

(71) Applicant: Robert C. Whetsel, Frederick, MD (US)

(72) Inventor: Robert C. Whetsel, Frederick, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/738,361

(22) Filed: Jun. 12, 2015

(65) Prior Publication Data

US 2015/0355954 A1 Dec. 10, 2015

Related U.S. Application Data

(63) Continuation of application No. 13/058,782, filed as application No. PCT/US2009/053573 on Aug. 12, 2009, now Pat. No. 9,069,626.

(60) Provisional application No. 61/088,209, filed on Aug. 12, 2008.

(51) Int. Cl.
*G06F 17/30* (2006.01)
*G06F 9/54* (2006.01)

(52) U.S. Cl.
CPC ......... *G06F 9/541* (2013.01); *G06F 17/30569* (2013.01)

(58) Field of Classification Search
None
See application file for complete search history.

(56) References Cited

U.S. PATENT DOCUMENTS

| 5,999,937 | A | 12/1999 | Ellard |
| 6,208,345 | B1 | 3/2001 | Sheard et al. |
| 2003/0140058 | A1 | 7/2003 | Martin et al. |
| 2004/0015366 | A1 | 1/2004 | Wiseman et al. |
| 2007/0220063 | A1 | 9/2007 | O'Farrell et al. |
| 2008/0222192 | A1 | 9/2008 | Hughes |

OTHER PUBLICATIONS

International Search Report for WO 2010/019683, issued by KIPO, Feb. 24, 2010.

*Primary Examiner* — Bai D. Vu
(74) *Attorney, Agent, or Firm* — Mannava & Kang, P.C.

(57) ABSTRACT

Trusted Client-Centric Application Architecture (TC²A²) provides the ability to securely exchange data between applications. TC²A² may be used to perform functions requiring data exchange between applications that typically may not be able to communicate with each other. TC²A² uses a universal data set to exchange data. Application data from a source application is converted to a universal data set, and then converted to application data for one or more target applications. Application data is then propagated to respective native applications. TC²A² provides the ability to update, modify, and manipulate data for a plurality of applications using a single user interface.

19 Claims, 11 Drawing Sheets

TRUSTED CLIENT-CENTRIC APPLICATION ARCHITECTURE

PRIORITY

The present application is a continuation of co-pending U.S. patent application Ser. No. 13/058,782, filed Feb. 11, 2011, which claims priority under 35 U.S.C. §371 to PCT Application PCT/US2009/053573, filed on Aug. 12, 2009, which claims priority to Provisional Application Ser. No. 61/088,209, filed on Aug. 12, 2008, the disclosures of which are hereby incorporated by reference in their entireties.

BACKGROUND

Advances in technology over the years have greatly increased the number of computer software applications available to meet the needs of computer users. This demand for the increased number of applications and data management have enabled an evolution in computing environments to extend to modern architectures that we use today. One example would be distributed computer processing, which uses "data exchange" to expand computing from a single machine to multiple machines across computer networks.

Advances in development/evolution of software have not kept pace with the diverse needs of users. While there are definite benefits to current software architectures, their complexity and structure can make it difficult to freely and securely exchange data with each other. A common frustration is entering data into one application and finding that it cannot be shared with another application. The amount of data entered into these applications by users has increased in complexity, and grown exponentially. This leads to re-entering of data, copying/pasting, or importing data that takes a lot of time, can introduce errors, or data corruption and integrity issues. This lack of communication between applications has become a major problem given the vast amount of data that users generate and need to access and analyze.

Not surprisingly, the evolution of computing environments continues to be based on more complex computer architectures. The sheer complexity of the computing environments have further hindered interoperability with limited or no data exchange between applications from different architectures.

"Data exchange" refers to the taking of data structured according to a source computer application and transforming it into data structured according to a target computer application. By using "data exchange," the evolution in computing environments served to meet even more needs of even more computer users.

Now a description is provided of different software architectures and disadvantages of some of the architectures. This is followed by a discussion of the disadvantages of the architectures affecting the data exchange between applications created under the different architectures.

Initially, application developers implemented 1-tier computer applications according to 1-tier architecture by using the "monolithic" computing model. Each 1-tier application in its entirety consisted of one software module. Therefore, each 1-tier application was self-contained, resided on one machine, and operated independently. Accordingly, users did not easily exchange data between applications running on different machines.

Later, application developers implemented 2-tier computer applications according to 2-tier architecture by using the "client-server" model. Each 2-tier application included two software modules, the "client" and "server." Each application could theoretically reside on the same machine. More typical however, 2-tier applications were distributed across one or more networks, each client residing on a different machine from its counter-part server. However, data exchange in 2-tier applications did not reach beyond the client-server application nor beyond the machines on which the application resided. Accordingly, user-benefit from data exchange was limited.

Even later, application developers implemented multi-tier applications according to an architecture having three basic tiers, the "interface-tier," the "logic-tier" and the "data-tier." Typically, the "interface-tier" or upper-tier included a single software module residing on a client machine; the "logic-tier" or middle-tier included one or more logic-modules each residing on a logic-machine; and, the "data-tier" or lower-tier included one software module residing on a database-machine. In this, the multi-tier application simultaneously resided on different machines. Therefore, multi-tier applications were considered distributed computer processing. However, data exchange in the multi-tier application did not reach beyond the multi-tier application nor the machines on which the multi-tier application resided. Accordingly, user benefit from data exchange is also limited.

Service-oriented architecture (SOA), a more recent software architecture, was designed to facilitate data exchange between disparate systems. SOA defines and provisions the IT infrastructure with a system and method to allow different applications to exchange data and participate in business processes. SOA uses messaging and generic interfaces to communicate between dissimilar systems. SOA separates functions into distinct units (services), which are distributable over networks, combinable and reusable to create business applications. These services communicate with each other by passing data from one service to another, or by coordinating an activity between two or more services. SOA works well for exchanging data between applications programmed under a particular SOA, such as a .Net platform. However, data exchange issues are still present when communicating with applications created under a different SOA platforms.

From an end user's perspective, these current architectures have constraints, because control of the applications is still in the vendor's or developer's hands. While functionality (as in tasks) may be changed to user's needs to a limited extent, the coding (which represents true control) is still with the vendor or developer. Conflicts on agreeing to a universal standard or universal data structure leads back to the situation where there are individual standards for each vendor. Interoperability between applications using the architectures discussed above still depends on agreement among vendors. Therefore, end-users are still tied (locked-in) into the application choices made by the vendor.

For example, a user may desire to exchange contact or calendar information between two different customer relationship management (CRM) applications made by two different vendors and possibly programmed under two different software architectures. For example, a user may be using a web-based CRM application, and a personal computer (PC)-based CRM application that may have complementing features. In order to provide data exchange between the two programs, such as for synchronizing the contact and calendar information, code would have to be written that converts contact and calendar data from a data format used by the web-based CRM to a data format used by the PC-based CRM and vice versa. If the user has multiple CRM applications, this specialized code must be provided for each pair of applications that need data exchange. This becomes quite a cumbersome, as well as costly, task. In fact, the specialized code is usually written by a vendor so that users would migrate off of a competitor's platform. Normally code is not written to keep both applications in use, and vendors' in general are not open to assisting users if they believe that the user will be moving their data to another vendor.

End users are not the only ones to experience frustration because of disparate architectures and lack of interoperability between applications created under different architectures; computer system administrators and software application developers suffer as well. As a computer systems become obsolete, or unsupported, and users' still need features offered by the legacy application. One technique used is to export delineated files from the legacy application, and then import them into the newer one. Normally, data from legacy systems are exported as a one-way/one-time event, and lack the ability to exchange data with newer applications continuously. In addition, importing data into and exporting data outside a particular product's suite of applications using, for example, comma-delineated files can be inconsistent between different architectures (most likely due to mixed encoding schemes).

Thus, due to (1) the lack of interoperability between the non-obsolete already-employed computing power and the already-available expanded and increased computing power, (2) the lack of interoperability between applications created under different software architectures; and (3) the resulting financial pressure to extend the life-cycle of legacy computer systems and applications and to more fully realize investments therein, banking, military, government, business, and end users are all faced with a choice, of selecting one application over another. This may result in either prematurely retiring perfectly usable applications, loss of convenience, and other disadvantages. This choice will persist at least until there is interoperability between software applications.

BRIEF DESCRIPTION OF DRAWINGS

Features of the present invention will become apparent to those skilled in the art from the following description with reference to the figures, in which.

DETAILED DESCRIPTION

For simplicity and illustrative purposes, the principles of the embodiments of the invention are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures may not be described in detail so as not to unnecessarily obscure the description of the embodiments of the invention.

Overview of the $TC^2A^2$

According to an embodiment, a Trusted Client-Centric Application Architecture, $TC^2A^2$ is configured to function as a universal application translator that allows applications to freely communicate with each other and exchange data in a safe and secure manner across domains. In particular, the $TC^2A^2$ enables data sharing across multiple applications, enables data sharing between different users, enables data sharing across domains, and enables system life cycles to be extended.

For example, major interoperability problems exist in governmental and business IT infrastructures and they are actively seeking effective cross-domain solutions. A major consideration for all sectors is balancing the need for access or transfer between two or more differing domains with the need for security and privacy. Furthermore, for military, civilian government, and health care sectors, the freedom to use critical applications and have them work together is vital to their missions. Military, civilian government and health care information technology infrastructures need next-generation architecture for interoperability to ensure security and privacy practices. They have costly mission-critical applications that have planned obsolescence. Vendor lock-in is a huge disadvantage especially for these sectors that are vital for public health and national security. These sectors are particularly vulnerable because of their specialized needs and disparate systems. Fiscal constraints can be a major impediment for adoption of new technology that can also limit leverage with vendors. Therefore, an approach that steers away from being dependent on vendors is needed to really address the communication barrier between disparate domains/systems. The $TC^2A^2$ provides an architecture enabling communication between various applications from different vendors and running on different hardware platforms.

$TC^2A^2$ provides a level of control that is user-centric rather than vendor-centric. This circumvents the controls maintained by vendors on current architectures. A unique aspect of this approach is the concept of a "Shared Sandbox." A sandbox is a virtual container in which untrusted programs can be safely run. $TC^2A^2$ expands the concept of a virtual container to a Shared Sandbox, in which sharing and communication among different applications can occur once trust has been established. Data, functions and business intelligence are normalized or translated in the Shared Sandbox so that different applications can exchange information in a controlled, secure environment.

$TC^2A^2$ captures the best features of each application for the user experience without modification of the original applications, referred to as native applications or just applications. Data can be exchanged and disseminated throughout applications in this architecture. Access to legacy systems can be maintained which extends the life cycle of software. In addition, users can share data and communicate on a continual basis effectively and securely between applications, with other users, and across multiple domains. Current architectures like SOA can be "encapsulated" within this architecture to allow applications in different domains to interact in a secure environment with permissions set by users. This architecture offers interoperability, economical and accessible computing.

TERMS AND DEFINITIONS

Below is a list of terms and corresponding definitions. Many of these terms describe components of the $TC^2A^2$. The components may be modules comprised of software. Note that these definitions are an aid to the understanding of the terms, and the terms and claims are not necessarily limited to these definitions.

Application Data Module—normalizes (encapsulates) data from each native application for the data to be used by modules controlled by the Universal Controller. In turn, data coming from the Universal Data Module can be translated back into the form recognized by the native application.

Application Logic—translates application functions such as "open file", "close file", "minimize window", "maximize window", "save file" and "save file as", etc. between its respective native application and the Universal Controller. Thus, the particular set of application logic commands within a particular application is translated to a set of universal commands used by the modules controlled by the Universal Controller. In turn, commands coming from the Universal Data Module can be translated back into the form recognized by the native application. This facilitates communication back and forth between the Universal Controller and the native application.

Application Logic Controller—the module with a universal set of logic that controls application functions such as "open file", "close file", "minimize window", "maximize window", "save file" and "save file as", etc. The controller allows the Universal Controller to manage application logic functions across all application(s).

Business Intelligence—translates concepts, methods, and functions used to define business decisions between the Universal Controller and native applications. Thus, the particular set of concepts, methods and functions used to define business decisions within a particular application is translated to a universal set of commands used by the Universal Controller. In turn, business intelligence coming from the Universal Data Module can be translated back into the form recognized by the native application. This facilitates communication back and forth between the Universal Controller and the native application.

Business Intelligence Controller—contains a universal set of concepts, methods, and functions and allows the Universal Controller to manage business decisions across all application(s).

Figure 3:
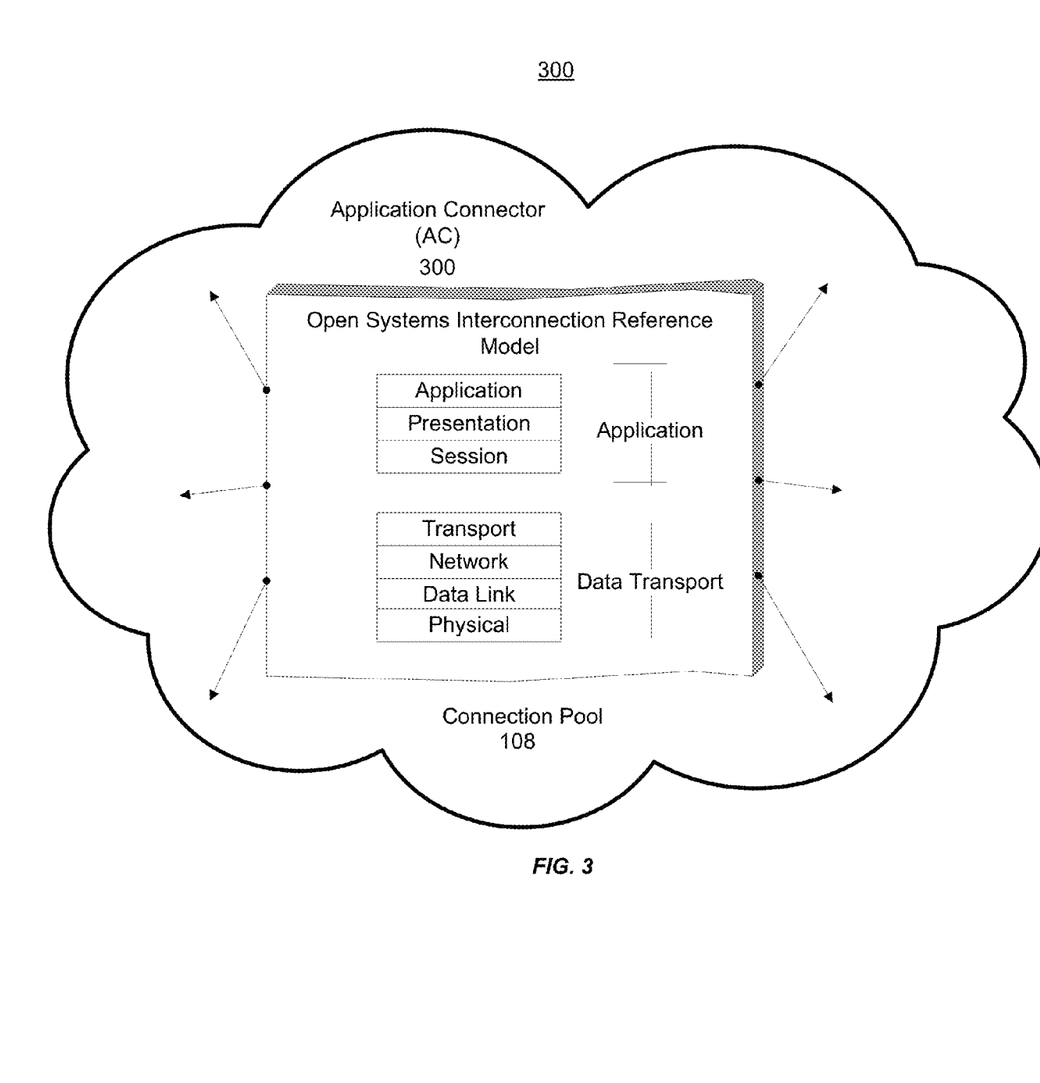
FIG. 3 illustrates a diagram of a connection pool used to connect all the modules within the $TC^2A^2$, and the $TC^2A^2$ to applications, according to an embodiment of the invention.

Connection Pool—acts to facilitate communication between all modules within the $TC^2A^2$, and between the $TC^2A^2$ and the native applications. Any way of transmitting data could be used including but not limited to connections utilizing TCP, UDP, IP, PPP and HTTP. In the embodiment of FIG. 3, the connection pool 300 is configured so that all the modules described in FIG. 3 communicate and communication can be accomplished through a variety of methods. In this, a programmer may define the connection pool 300. For example, the programmer may program $TC^2A^2$ 100 to operate using one big connection pool, many small connection pools, a few medium sized connection pools, or any combination thereof.

Identity Management—module that centrally manages the user's authentication credentials for all applications and domains; any authentication procedures could be used.

Native Application—an application running in its original architectural environment outside of the Shared Sandbox.

Normalized Application Container—that controls modules that normalize Business Intelligence, Application Logic, and Application Data for each application. Thus, the Normalized Application Container "translates" between a native application and the Universal Controller.

Permissions Management—interacts with the Identity Management to grant another user access to a single information event in a user's domain. In particular, it encrypts and encapsulates a user's authentication credentials for a particular application domain for a single information event. This module creates a trusted computing base that facilitates cross-domain sharing while maintaining strict security protocols, and rules of trust.

Shared Sandbox—includes the Universal Interface, Universal Controller, Universal Data Module, Connection Pool, and all Normalized Application Containers and all modules controlled by the Universal Controller and Normalized Application Container(s).

Synchronization—module that when executed, clears temporary data storage and synchronizes data in all applications and commits all relationships to the Universal Data Module. Synchronization ensures data integrity, and a positive data redundancy across all applications.

User intelligence—controls business intelligence and application logic that is user-defined and functions to create business logic and rules that apply across all desired applications.

Universal Controller—manages the different native applications through the Normalized Applications Container(s). Controls a set of modules that control business intelligence, user intelligence, application logic, identity management, permission management and synchronization.

Figure 4:
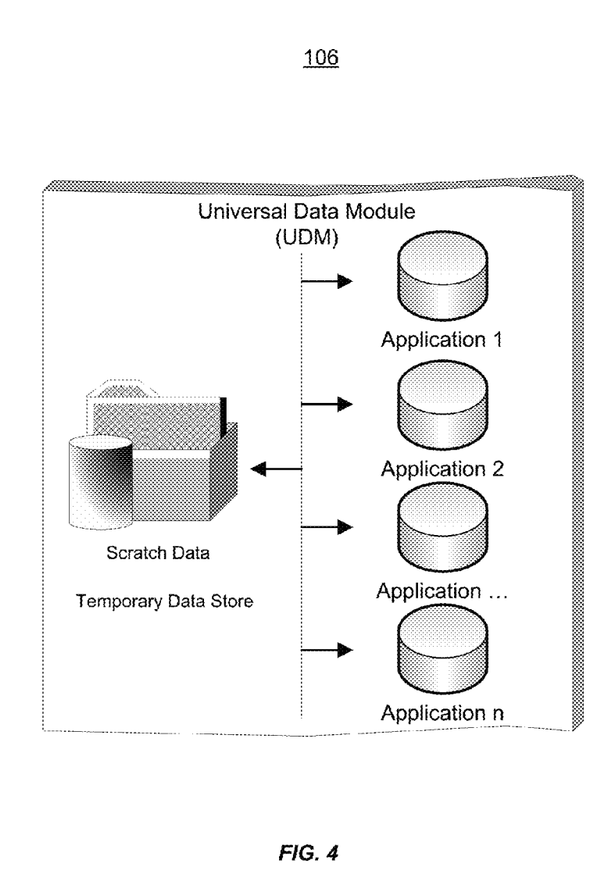
FIG. 4 illustrates a diagram of the UDM which creates and maintains relationships for all applications, stores data for all modules within $TC^2A^2$, contains temporary data and performs various features described herein, according to an embodiment of the invention.

Universal Data Module—creates and maintains relationships for all applications, stores data for all modules in this architecture and contains temporary data (scratch data 402) of any kind for all applications using a temporary data placeholder while the data are being used and waiting for synchronization. After synchronization temporary relationship data becomes permanently stored in the universal data set. The Universal Data Module may use any data structure including but not limited to linked lists, arrays, queues, stacks, trees, and any databases such as MySQL, SQL Server, Access, Oracle, and any file structures such as xml or csv.

Universal Interface—Single user interface for all $TC^2A^2$ applications in the shared sandbox.

System Diagrams of $TC^2A^2$ and Components of the $TC^2A^2$

The components of the $TC^2A^2$ are described by their attributes and functions and can reside anywhere. These functionalities and attributes can be accomplished in modular or non-modular approaches but for ease of presentation, the figures described below represent the functionalities and attributes as relationships among modules. Therefore, the modules represented within the Universal Controller and the Normalized Application Containers can reside anywhere. In the following descriptions and examples, various modules of the $TC^2A^2$ are named for clarity of presentation but are not limited to the meaning of these names. Therefore, the iterations of this invention include but are not limited to the representations in the following figures.

Figure 1:
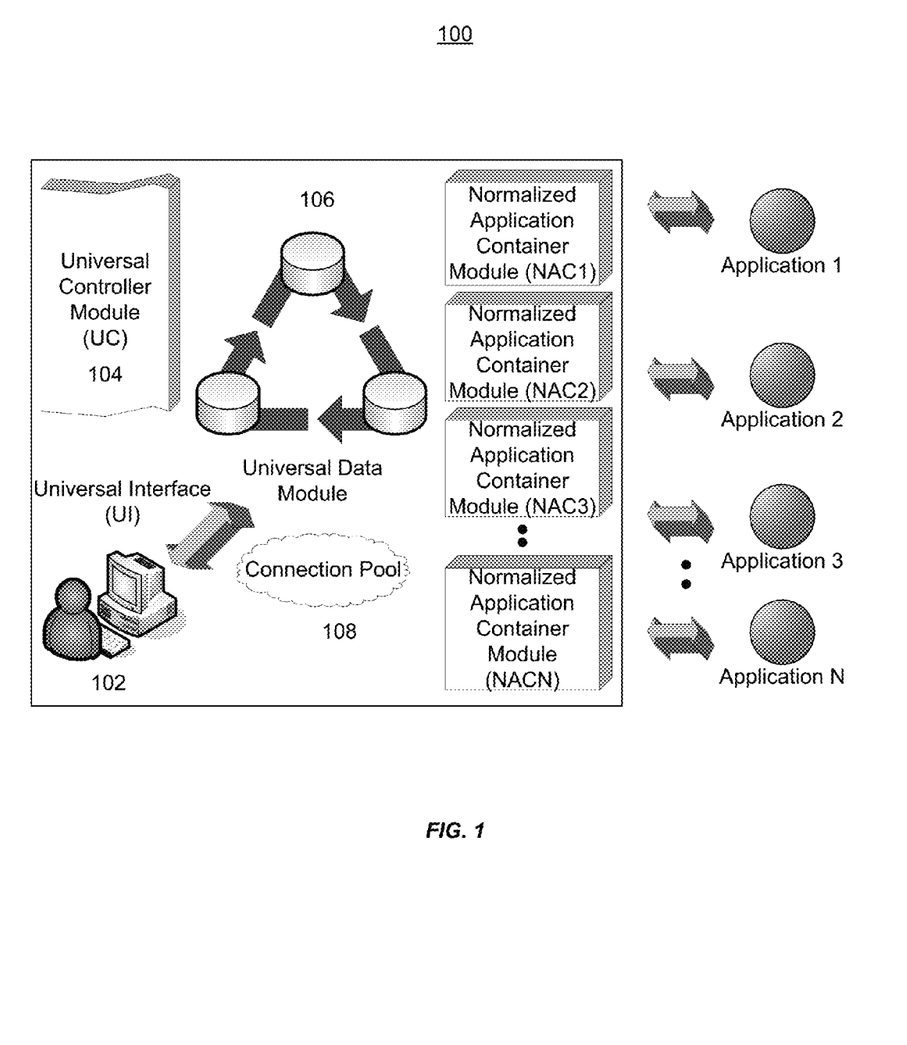
FIG. 1 illustrates a diagram of a Trusted Client-Centric Application Architecture ($TC^2A^2$) configured to perform various functions described herein, according to an embodiment of the invention.

FIG. 1 illustrates a diagram of an $TC^2A^2$ 100, according to an embodiment of the invention. The $TC^2A^2$ 100 described in the embodiment of FIG. 1 may include additional components, modules, and/or elements and some of the components, modules and elements described herein may be removed and/or modified without departing from the functionality of the $TC^2A^2$ 100.

The $TC^2A^2$ 100 includes a universal interface 102, a universal controller 104, a universal data module 106, connection pool 108, and normalized application containers (NAC) 1 through N where N is an positive integer corresponding to the application numbers, application 1 through N.

Once a native Application, such as any of Applications 1 to N, is initialized into the architecture, it is considered connected to the $TC^2A^2$ 100 until it is removed. The original native application is not modified by this architecture.

Figure 11:
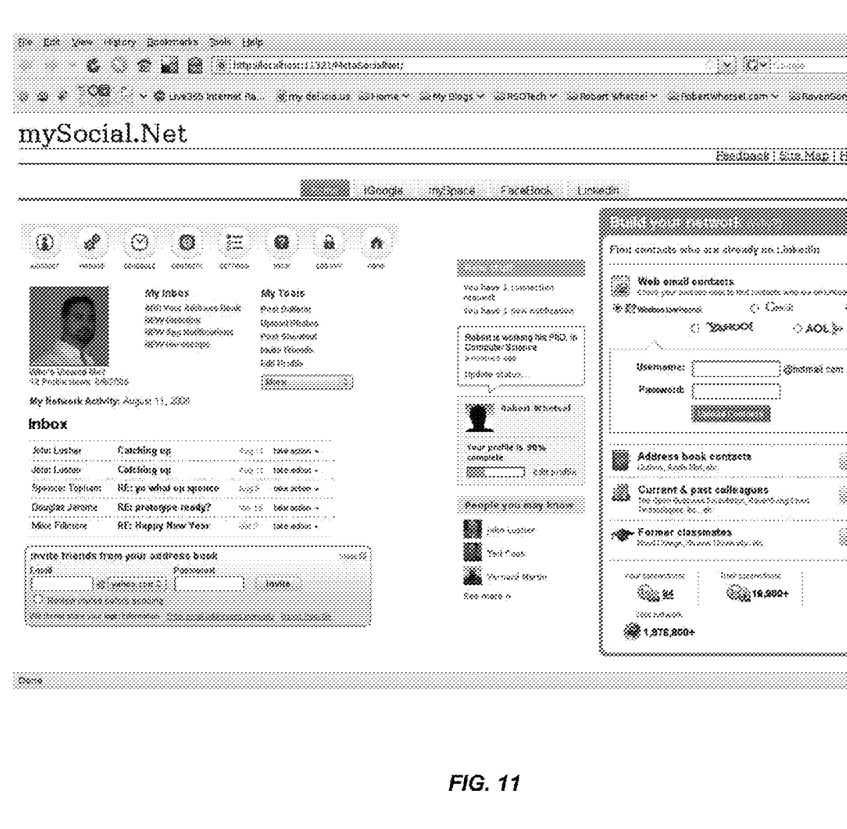
FIG. 11 illustrates an example of a screen shot for a universal interface used by the $TC^2A^2$, according to an embodiment of the invention.

The Universal Interface 102 provides a user interface for the $TC^2A^2$. An example of a screen shot of the interface is shown in FIG. 11. The Universal Interface 102 can display any data called from any application connected to the $TC^2A^2$. Input at the Universal Interface can be used to create, modify, and manipulate data in any application connected to the $TC^2A^2$. The User Interface 102 connects with the Universal Controller 104. Each application 1 to N has its own NAC. The NAC communicates with the Universal Controller 104 as well as its native application. The Universal Interface 102, Universal Controller 104, Universal Data Module 106, Connection Pool 108, and all the NACs are part of the Shared Sandbox. Data, functions and business intelligence are normalized or translated by the modules controlled by the respective NACs so that different applications can exchange information in a controlled, secure environment. The Universal Data Module 106 is further described in FIG. 4.

Figure 2:
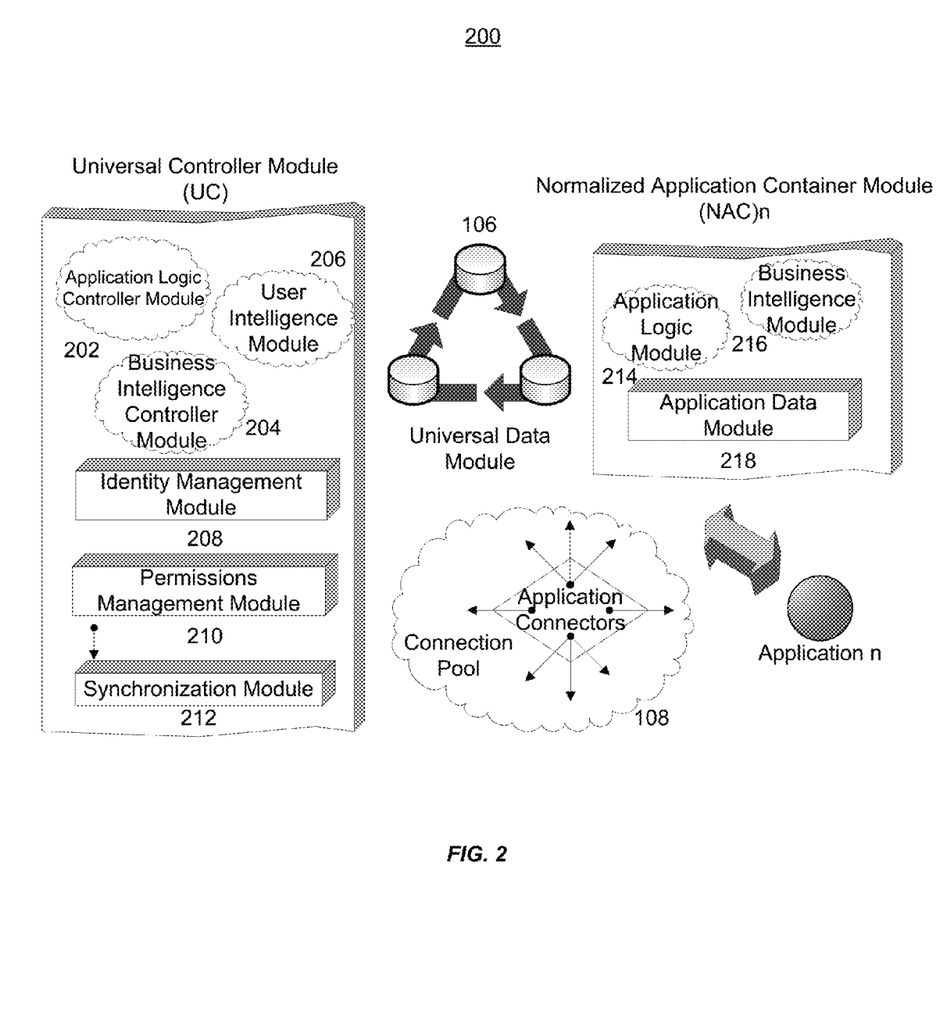
FIG. 2 illustrates a diagram of the $TC^2A^2$ configured to connect a Universal Controller module (UC) and an nth Normalized Application Container module (NAC) using a Universal Data Module (UDM) and Connection Pool and operable to perform various features described herein, according to an embodiment of the invention.

FIG. 2 shows more detail of the Universal Controller 104 and the NACs. The Universal Controller 104 controls an application logic controller module 202, a business intelligence controller module 204, a user intelligence module 206, an identity management module 208, a permission management module 210 and a synchronization module 212. Each NAC controls its respective application logic module 214, business intelligence module 216, and application data module 218. The Connection Pool 106, (more detailed shown in FIG. 3) enables communication among all modules within the $TC^2A^2$, and between the $TC^2A^2$ and the native applications.

The application logic 214 and the business intelligence 216 translate application functions and business intelligence back and forth between the respective native application and the Universal Controller 104. The application data module 218 encapsulates data from the native application to be used by Universal Controller 104 and, in turn, data coming from the Universal Data Module 106 can be translated back into the form recognized by the native application.

The Synchronization Module 212 controls the synchronization of the datasets among the applications connected to the $TC^2A^2$. Synchronization is first triggered by an application initialization (the first time run of the application) of any application. After initialization, a triggering event could be user-defined, for example, addition of new data, execution of a certain application function, or addition of a new application to the $TC^2A^2$ 100, or default settings could be a trigger linked to a certain event or based on time. For example, when any change is saved in the Universal Interface 102, that change would be temporarily stored in the Universal Data Module 106 until synchronization is triggered to propagate the change to the desired applications initialized in the $TC^2A^2$ 100. Propagating the change includes denormalizing application data or other information in the application data set that has been changed to the respective application data set for any target applications that are to receive the changed data.

The Permissions Management module 210 allows for sharing of information between applications, different users and across multiple domains. Using $TC^2A^2$, one user of a CRM application can give permission to another user to access contact and all related records. Without using $TC^2A^2$, individual native applications may not freely communicate and share data with each other outside the Shared Sandbox.

The Identity Management module 208 centrally manages the user's authentication credentials for all applications and domains. This provides an added layer of security through user authentication.

The User Intelligence 206 is a set of intelligence rules that can be customized to a user's chosen workflow. For example, a user may want the event of adding a record to their CRM application to trigger the record to be automatically sent to another user, along with an email to inform them of the addition. Therefore, a rule would be created for this trigger and would be carried out through application logic and/or business intelligence.

The Application Logic Controller 202 is a module that controls all the Application Logic 214 modules in the $TC^2A^2$. The Application Logic 214 modules translate applications functions, such as opening and closing files, minimize/maximize window, save file, etc. The Business Intelligence Controller 204 controls all the Business Intelligence 216 modules in the $TC^2A^2$. Business Intelligence 216 translates concepts, methods, and functions used to define business decisions between the Universal Controller 104 and native applications. Thus, the particular set of concepts, methods and functions used to define business decisions within a particular application is translated to a universal set of commands used by the Universal Controller 104. This facilitates communication back and forth between the Universal Controller 104 and the applications.

FIG. 3 illustrates a connection pool 108 including the application connectors 300. FIG. 3 shows an example of data transport layers and application layers in an application connector. These layers facilitate communication between the applications and the $TC^2A^2$ 100 and among all modules within the $TC^2A^2$ 100.

FIG. 4 illustrates the Universal Data Module 106. The Universal Data Module 106 1) creates and maintains relationships for all applications and 2) stores data for all modules in the $TC^2A^2$ and 3) contains temporary data (scratch data 402) of any kind for all applications using a temporary data placeholder while the data are being used and waiting for synchronization. The scratch data 402, for example, is used when synchronizing between applications. For example, CRM data from application 1 is received from NAC 1 and is converted to the universal data set and stored as scratch data until it can be synchronized with other applications.

Note that in the example described above, CRM data from an application container is converted to a universal data set. This is a data format used by the $TC^2A^2$ 100. All data from the NACs to be exchanged with other NACs is converted to the universal data set. Converting data from a format understood by the application (i.e., the application data set which is in the NAC for the application) to the universal data set is referred to as normalizing the data set. Then, the NACs, Universal Data module and universal controller convert data from the universal data set to a format understood by each application to receive the data, which is provided in the corresponding NAC. This is referred to denormalizing. Normalizing and denormalizing may be performed using any data structure including but not limited to linked lists, arrays, queues, stacks, trees, and any databases such as MySQL, SQL Server, Access, Oracle, and any file structures such as xml or csv. The universal data set is unique to the $TC^2A^2$ and allows data to be freely exchanged between applications. Also, synchronization and data exchange using the universal data set may be controlled by a combination of user and/or business intelligence and permissions.

Figure 5:
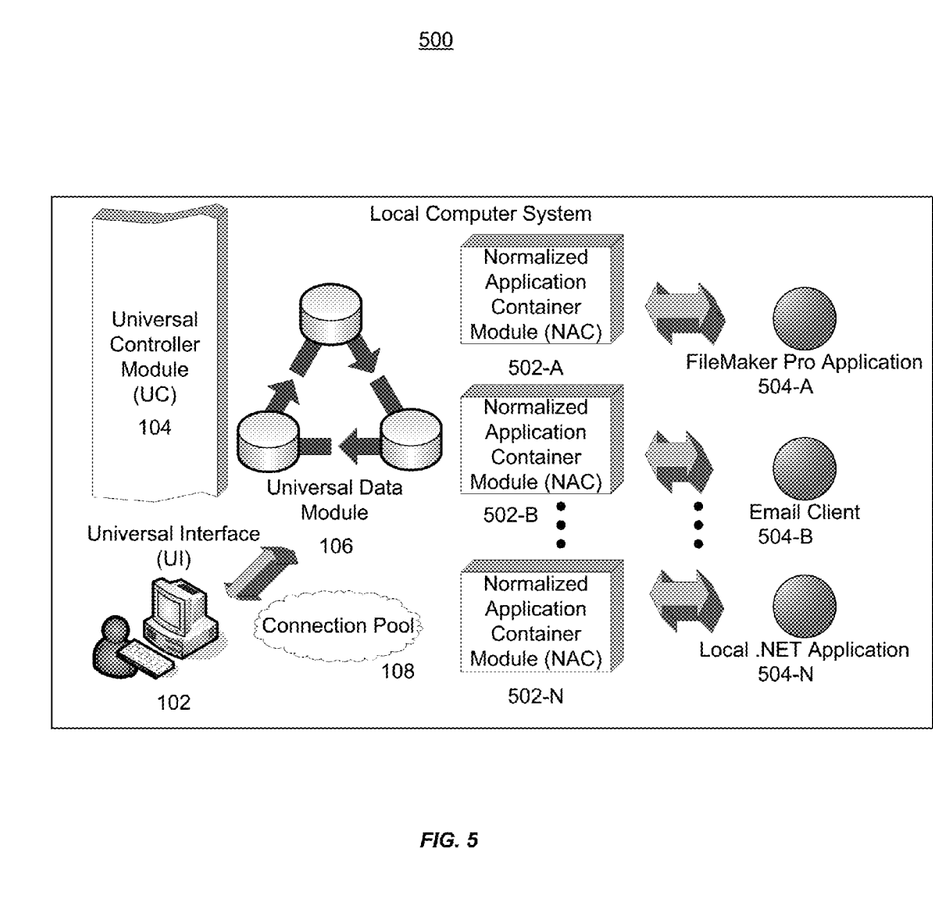
FIG. 5 illustrates a diagram of the $TC^2A^2$ configured using a local computer system, according to an embodiment of the invention.

FIG. 5 shows the $TC^2A^2$ 100 implemented in a local computer system 500, such as a PC, laptop, cell phone, PDA or other end user device. The local computer system 500 in the embodiment of FIG. 5 includes the universal interface module 102, the universal controller module 104, the universal data module 106, a connection pool 108, a normalized application container module 502-A, a normalized application container module 502-B, a normalized application container module 502-N, a FileMaker Pro application 504-A, an e-mail client 504-B, and a local .net application 504-N. Other NACs and applications may be included.

The Universal Interface 102 provides a user interface for all the applications initialized with the $TC^2A^2$ 100 on the local computer system 500. The $TC^2A^2$ may exhibit qualities, attributes and features of all of the applications that have been initialized into the $TC^2A^2$ environment. For example, a user would be able to share data within an email client with the local FileMaker Pro customer relationship management (CRM) application, and .Net Enterprise Project Management (PM) applications. In addition, the user is able to share contact information from their address book directly with the PM and CRM applications without reentering the information into either application.

Figure 6:
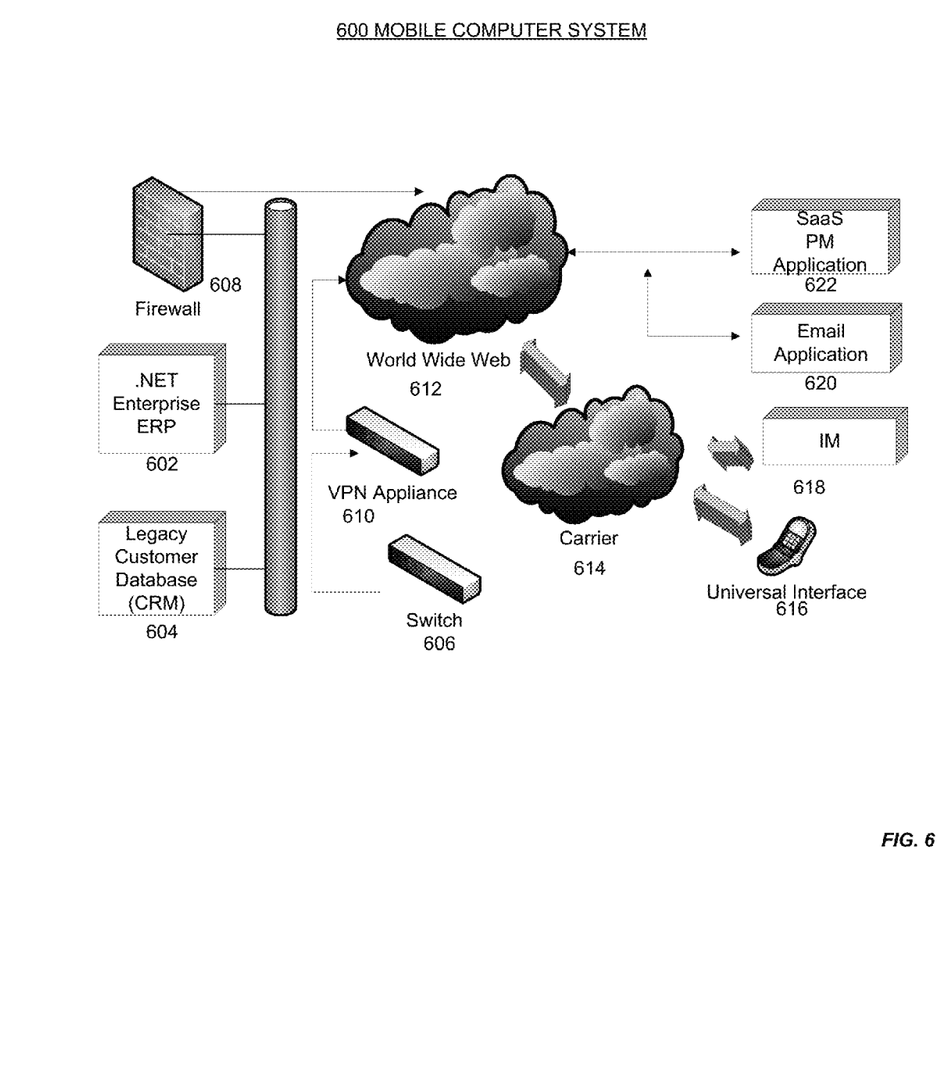
FIG. 6 illustrates a system diagram showing that the $TC^2A^2$ is operable to facilitate data exchange between enterprise computer systems, mobile computer systems, and other computer systems, according to an embodiment of the invention.

FIG. 6 illustrates that the $TC^2A^2$ can be used for data exchange among applications running on different computer systems and in different domains. For example, applications 616, 618, 620 and 622 may be running on one or more mobile devices, local computer, etc. $TC^2A^2$ allows data exchange over various networks and with enterprise applications running inside a firewall. For example, a user receives an instant message that informs them that they have been assigned a new task concerning another user's client. Using their mobile device to connect through their carrier network, the mobile user is able to login to their corporate virtual private network (VPN) account and have access to the assigned client's information in the Legacy Customer Data Base CRM application 604. In addition, at the same time, they are able to log into the ERP application 602 to access their assigned task. If $TC^2A^2$ was not used, the information would remain in an isolated location and the other user would not be able to access or safely share this data. The user would need to follow what, if any, data sharing procedures where outlined by the application in order to gain access. In many cases these steps are cumbersome, introduce the potential for duplicate or incorrect data opportunities, and may have security implementation issues. This potential can grow exponentially especially if large data sets are involved. Thus, $TC^2A^2$ allows automatic data processing among applications in different architectures to assure data integrity, and produce a positive data redundancy all within a trusted computing base.

In $TC^2A^2$, a single access event will grant access to all information needed to complete the task assigned to the user. Once the task is completed, the user would send a completion notification using an instant message. Using a single access event, the user allows the task manager to access information in their project management Project Management SaaS application 622 and information in the CRM 604 that has been updated. Furthermore, the Synchronization in this event would also update information for the assignee and original owner in his/her CRM application.

Therefore, these different applications would be able to share and exchange updated data continually. We have crossed domains with various applications in different architectures and shared data between users through multiple transmittal agents.

Figure 7:
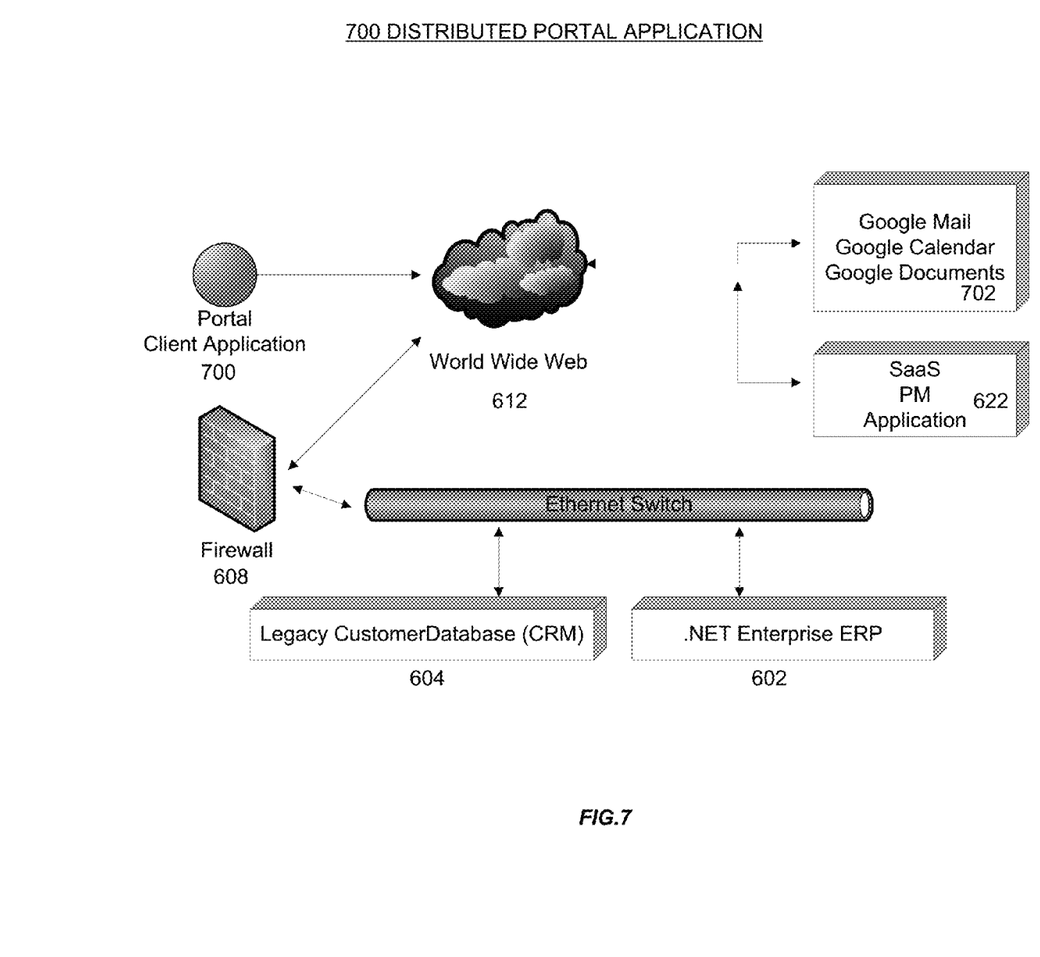
FIG. 7 illustrates a system diagram showing that the $TC^2A^2$ is operable to facilitate data exchange between a distributed portal application and other applications, according to an embodiment of the invention.

FIG. 7 illustrates the $TC^2A^2$ as a distributed portal application. The $TC^2A^2$ application is a portal application that has the ability to interface with multiple types of applications. Essentially, the $TC^2A^2$ portal application 700 may exhibit qualities, attributes and features of all of the applications and share data across all of these systems and domains within a trusted computing base. For example, a portal application could take on the role of a universal application for multiple applications such as: Google's g-mail or MSN's Hotmail 702 email service, an internal .Net Enterprise Resource Planning (ERP) 602, a project management application offered as a Software as a Service 622, and a legacy FileMaker Pro Pro customer database 604. This example allows the user's client to reside anywhere as long as they have access to an Internet connection.

The properties of a $TC^2A^2$ Universal Interface would allow the user to access data from the legacy customer database, and integrate data-types with newer applications such as the SaaS Project Management application and the new .Net ERP application as if they were a single application. The Synchronization of all data fields between the applications eliminates data integrity issues. Additionally, the same data could be stored in multiple applications, therefore creating a positive data redundancy (identical data across multiple systems).

Methods

Figure 8:
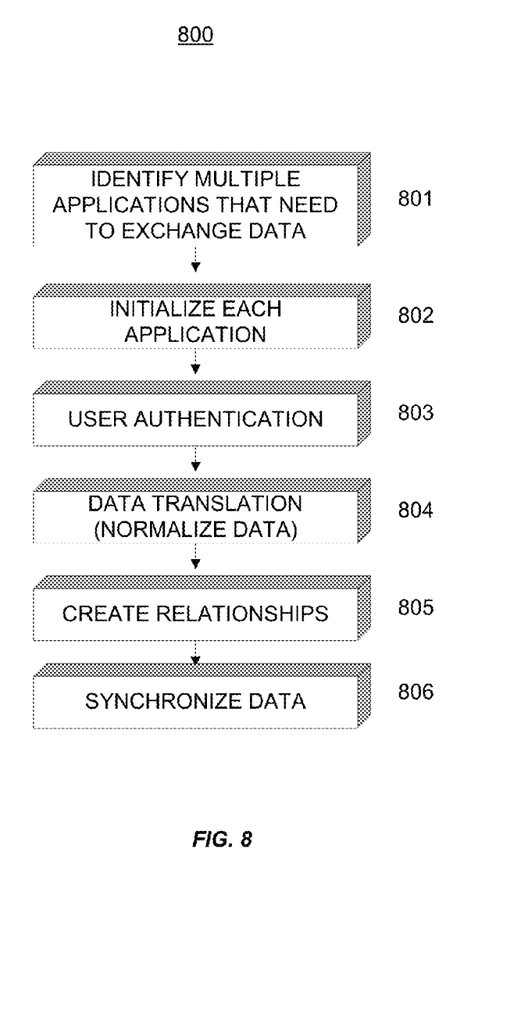
FIG. 8 illustrates a flow diagram of a method for initializing the $TC^2A^2$, according to an embodiment of the invention.

FIG. 8 illustrates a flow diagram of the method 800 for configuring the $TC^2A^2$ 100 for data exchange, according to an embodiment. The method 800 described initialization of applications with the $TC^2A^2$ and registering user and business intelligence.

At step 801, the $TC^2A^2$ 100 identifies multiple applications that need to exchange data. The applications may be identified by a user. At step 802, each application is initialized by the $TC^2A^2$. Initializing the applications include creating a NAC and all modules controlled by the NAC for each application. At step 803, the TC²A² receives and stores user registration information for authenticating the user. At step 804, each module translates (normalizes) the respective application data set (may include application data, business intelligence, and application logic) to the universal data set (may include application data, business intelligence, and application logic). At step 805, the TC²A² creates relationships for the translated data set in the Universal Data Module. This includes a mapping, for example, between each field or components of the application data set and each field or component of the universal data set. Creating the relationships includes storing them in temporary storage (Scratch Data shown in FIG. 4) in the Universal Data Module. At step 806, synchronization is triggered as part of the initialization, and clears the temporary storage, and the applications are ready for use.

Figure 9:
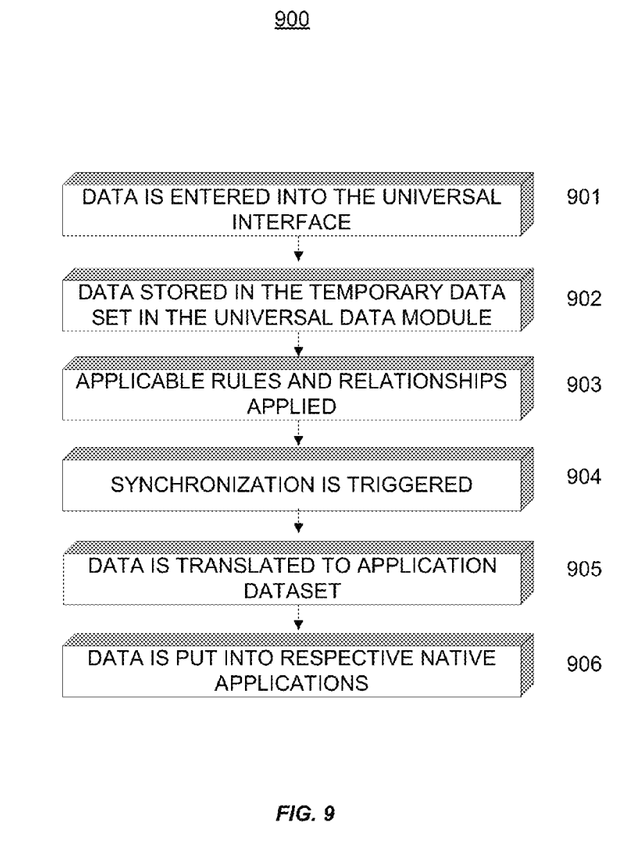
FIG. 9 illustrates a flow diagram of a method for using an initialized $TC^2A^2$, according to an embodiment of the invention.

FIG. 9 illustrates a flow diagram of a method 900 for using the TC²A² for data exchange among applications, according to an embodiment of the invention.

At step 901, data is entered at the Universal Interface. At step 902, the data is stored in temporary data set in the Universal Data Module 106.

At step 903, applicable rules and relationships stored in the Universal Data Module 106 are applied using controller modules 202, 204, 206, 208, 210, and 212 controlled by the Universal Controller 104. For example, the controller modules identify applicable 1) user-intelligence rules residing on the user intelligence controller module 206, 2) application-logic-rules residing on the application logic controller module 202, 3) business-intelligence residing on the business intelligence controller module 204, 4) identity-rules residing on the identify management module 208, 5) permission-rules residing on the permission management module 210 and 6) synchronization module 212.

At step 904, synchronization is triggered (by applicable rules) and the temporary data is cleared. At step 905, data is converted from a universal data set to each respective application data set and at step 906, data is put into respective native applications.

For example, let both the FileMaker Pro application 504-A and the e-mail client-server application 504-B be in the TC²A². A contact is added through the Universal Interface 102 as "Add New Contact". Let a user intelligence rule exist that all new contacts should be sent to both the FileMaker Pro application and the email client-server application. Thus, the new contact is propagated respectively to both 504-A and 504-B.

A related example involves entering of a new user intelligence rule into the Universal Interface where any new contact should be propagated to a .NET PM application 504-N as well as 504-A and 504-B. Another related example is a combination of user intelligence and permissions management rules which allows sharing of one user's new contact with one other identified user in any or all of 504-A, 504-B or 504-N. Another related example is a combination of business intelligence, user intelligence, and application logic rules which allow synchronization of existing application data and results in a universal data set.

Figure 10:
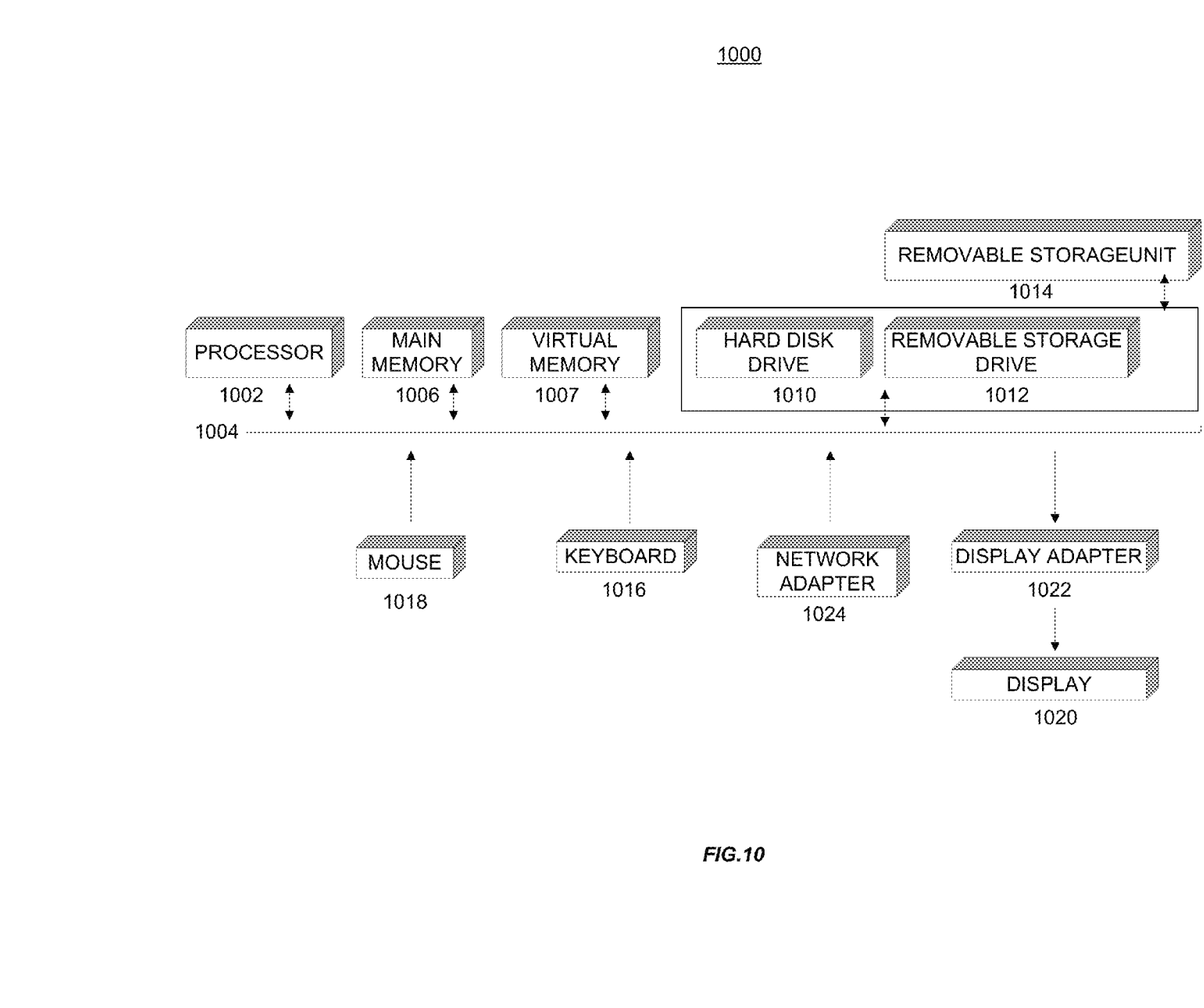
FIG. 10 illustrates a block diagram of a computing apparatus configured to implement or execute the methods 800 and 900 illustrated in FIGS. 8 and 9, according to an embodiment of the invention.

FIG. 10 illustrates a block diagram of a computer apparatus 1000, configured, for example, to implement or execute the methods 800 and/or 900 as described above. In this, the computing apparatus 1000 may be used as a platform for executing one or more of the functions described hereinabove with respect to the TC²A² and/or elements thereof described in the embodiments of FIGS. 1 through 7.

The computer apparatus 1000 includes a processor 1002 that may implement or executive some or all of the steps described in the methods 800 and/or 900. Commands and data from the processor 1002 are communicated over a communication bus 1004. The computer apparatus 1000 also includes a main memory 1006, such as a random access memory (RAM), where the program code for processor 1002 may be executed during runtime, and a secondary memory 1008. The secondary memory 1008 includes, for example, 1007 virtual memory, paging files or swap files, one or more hard disk drives 1010 and/or removable storage drive 1012, representing a floppy diskette drive, a magnetic tape drive, a compact disk drive, etc., where a copy of the program code for the methods 800 and 900 may be stored.

The removable storage drive 1010 reads from and/or writes to a removable storage unit 1014 in a well-known manner. User input and output devices may include a keyboard 1016, a mouse 1018, and a display 1020. A display adaptor 1022 may interface with the communication bus 1004 and the display 1020 and may receive display data from the processor 1002 and convert the display data into display commands for the display 1020. In addition, the processor(s) 1002 may communicate over a network, for instance, the Internet, LAN, etc., through a network adaptor 1024.

It will be apparent to one of ordinary skill in the art that other known electronic components may be added or substituted in the computing apparatus 1000. In addition, the computer apparatus 1000 may include a system board or blade used in a rack in a head end, central office, neighborhood node, a conventional "white box" server or computing device, etc. In addition, one or more of the components in the embodiment of FIG. 10 may be optional (for instance, user input devices, secondary memory, etc).

Example of User Interface Screenshot and Description of Various Uses of TC²A²

The TC²A² can automate the flow of data between analysis, design and simulation applications like spreadsheets, task plans, risk management databases, requirements databases, technical performance metrics and margins sheets, or monthly status reports. TC²A² is scalable and user-selectable. User and group permission and access controls are easily controlled. This example is viable in any market segment with the need to integrate business processes supported by disparate systems.

TC²A² can be used for automating the flow among many types of applications. In one example, TC²A² can be used for synchronizing social networking applications, such as LINKEDIN, MYSPACE, FACEBOOK, etc. FIG. 11 shows an example of a screenshot of the universal interface made available by TC²A². The user can enter data into the universal interface and the data is automatically propagated to all the user's social networking applications by TC²A². TC²A² may be used as social networking tool for collaboration among scientists working in different organization around the world. Bioinformatics requires the integration of heterogeneous data systems. This architecture would allow them to share data and disparate computational resources, and collaborate by visualizing data through a single user interface.

In another example, the US Military operates closely with foreign armies and local forces in various operations around the world. Coordination with these groups would be enhanced by this architecture enabling interoperability between coalition command and control systems. Security access and privacy rules would be clearly established. For example, foreign users could be authorized to send free text or instant messages, but would not be authorized to access tactical maps and plans. This example also includes mobile communication devices such as cell phones and tactical radios and could allow a common voice/data transport for different branches of the military and coalition forces.

The ability to dynamically update data models in support of enterprise application integration such as battle command or civilian government databases, health care, and education applications. This architecture represents a holistic approach to dynamic updating of data stores in multiple applications through one user interface customized to user preferences. A single database cannot support the data needs of the military or other enterprise-wide commercial services. This architecture supports integration and interoperability with Commercial-off-the-shelf (COTS)/Government-off-the-shelf (GOTS) technologies.

$TC^2A^2$ enables the continual integration and dispersal of new information into existing knowledge bases, including heterogeneous data sets from large health-related databases, such as patient data, population health data, or image databases. This architecture would ensure security and privacy for health care related enterprises using disparate systems. Ultimate end users of the developed technology would include researchers at universities, medical/health care and allied health providers, medical institutions performing clinical trials, hospitals, urgent care or health care centers, laboratories, radiology centers, health care administrators, or patients.

$TC^2A^2$ enabled mobile devices used by emergency responders such as police, firefighters, paramedics, disaster relief, and chemical or biohazard response teams to share communication and continuously update data. Mobile devices could integrate disparate systems such as common voice/data transport, vital statistics sensors, GPS data, knowledge bases and other critical applications to create continual situational awareness.

What has been described and illustrated herein are embodiments of along with some of their variations. The terms, descriptions and figures used herein are set forth by way of illustration only and are not meant as limitations. Those skilled in the art will recognize that many variations are possible within the spirit and scope of the embodiments, wherein the embodiments are intended to be defined by the following claims—and their equivalents—in that all terms are meant in their broadest reasonable sense unless otherwise indicated.

What is claimed is:

1. A method performed by a computer system executing software stored on a computer readable storage medium, the method comprising:
receiving an application data set from a source application;
normalizing the application data set to a universal data set, wherein normalizing the application data set received from the source application to a universal data set further comprises normalizing application data, business intelligence, and application logic for the source application to the universal data set;
storing the universal data set, wherein the universal data set is operable to be used and shared by one or more other applications;
denormalizing the universal data set to a target application data set;
transferring the target application data set to a target application;
receiving information via an interface;
storing the information in the universal data set;
denormalizing the information to a data set for at least one of the source application and the target application; and
transferring the denormalized information to at least one of the source application and the target application.

2. The method of claim 1, further comprising:
denormalizing the universal data set to the application data set of the source application; and
transferring the application data set of the source application to the source application.

3. The method of claim 2, wherein the denormalizing universal data set comprises including updates in the application data set of the source application.

4. The method of claim 3, further comprising:
updating the universal data set prior to the denormalizing of the universal data set to the application data set of the source application.

5. The method of claim 1, further comprising:
initializing the source application and the target application, wherein the initializing includes creating a normalized application container (NAC) for each of the source application and the target application, and each NAC is used to normalize data from the corresponding application.

6. The method of claim 5, comprising:
for each application, creating an application logic module, a business intelligence module, and an application data module, and the modules are operable to be used by the NAC to normalize data from the corresponding application.

7. The method of claim 1, wherein initializing further comprises:
prior to creating the NACs for the source application and the target application, registering users for the source application and the target application, wherein the registering includes storing user authentication information and access permissions for the source application and the target application.

8. The method of claim 7, wherein the registering creates a trusted computer base that allows the NACs to exchange data.

9. The method of claim 8, further comprising:
temporarily providing access between the source application and the target application through the trusted computer base for a single event.

10. The method of claim 1, further comprising:
creating and storing relationships between the application data, business intelligence, and application logic of the source application and application data, business intelligence, and application logic of the universal data set.

11. The method of claim 1, further comprising:
storing user intelligence or business intelligence that identifies events for triggering the normalizing and denormalizing.

12. The method of claim 1, further comprising:
updating, modifying, and manipulating data for a plurality of applications using a single user interface.

13. The method of claim 1, further comprising:
storing the universal data set; and
removing the universal data set from the temporary storage after the denormalizing from the stored normalized universal data set to the target application data set.

14. A computer system including a processor to exchange data between applications, the computer system comprising:
a universal interface receiving user information used to exchange data between applications;

a universal data module comprising machine readable instructions executed by the processor, the universal data module storing relationships for the applications to a universal data set;

a normalized application container (NAC) for each application, each NAC translates data to the universal data set from an application data set for an associated application and translates data from the universal data set to an application data set for one or more of the applications, wherein the translating is performed using the universal data module; and a universal controller comprising machine readable instructions executed by the processor, the controller controlling the translation of data based on one or more rules;

receiving information via an interface;

storing the information in the universal data set;

denormalizing the information to a data set for at least one of a source application and a target application, wherein denormalizing the information comprises denormalizing application data, business intelligence, and application logic in the universal data set for at least one of the source application and the target application; and transferring the denormalized information to at least one of the source application and the target application.

15. The system of claim 14, wherein the universal controller is configured to control translation of an application data set for the source application to the target application.

16. The system of claim 14, wherein the universal controller is configured to control translation of updates, modifications, and manipulations made to the universal data set to the application data set of one or more of the applications.

17. The system of claim 14, wherein user intelligence identifies events for automatically triggering the translating of one or more of the applications.

18. The system of claim 14, wherein business intelligence identifies business rules for translating between one or more of the applications.

19. A non-transitory computer readable medium storing machine readable instructions executed by a processor to:

control translation of data based on one or more rules;

receive information via an interface;

store the information in a universal data set;

denormalize the information to a data set for at least one of a source application and a target application, wherein to denormalize the information, the processor is to denormalize application data, business intelligence, and application logic in the universal data set for at least one of the source application and the target application; and transfer the denormalized information to at least one of the source application and the target application.

* * * * *